United States Patent [19]

Irwin

[11] Patent Number: 5,395,917
[45] Date of Patent: Mar. 7, 1995

[54] POLYIMIDES FROM 4-(3-AMINOPHENOXY)BENZOIC ACID

[75] Inventor: Robert S. Irwin, Wilmington, Del.

[73] Assignee: E. I. du Pont de Nemours and Company, Wilmington, Del.

[21] Appl. No.: 65,502

[22] Filed: May 21, 1993

[51] Int. Cl.⁶ .................. C08G 69/08; C08G 73/10
[52] U.S. Cl. .................................. 528/331; 528/125; 528/128; 528/170; 528/184; 528/188; 528/350; 528/353
[58] Field of Search ............... 528/184, 170, 125, 128, 528/188, 331, 350, 353

[56] References Cited

FOREIGN PATENT DOCUMENTS 3910276 10/1990 Germany .

*Primary Examiner*—Samuel A. Acquah
*Assistant Examiner*—P. Hampton-Hightower

[57] ABSTRACT

Thermoplastic poly(imide-esters) and poly(imide-amides) with repeat units derived from the title amino acid. In the polymer the amino group becomes part of an imide group and the carboxyl group becomes part of an ester or amide group. The polymers have a good balance of properties, making them useful for melt forming shaped articles, films and fibers.

18 Claims, No Drawings

POLYIMIDES FROM 4-(3-AMINOPHENOXY)BENZOIC ACID

FIELD OF THE INVENTION

This invention concerns poly(imide-esters) and poly(imide-amides) prepared using 4-(3-aminophenoxy)benzoic acid, a cyclic aromatic (di)carboxylic anhydride, and a diol or Ddiamine, or their reactive equivalents. These polymers are useful as molding resins and fibers.

TECHNICAL BACKGROUND

Polymers having a combination of high strengths and moduli, good high temperature properties, and ease of preparation are always of interest for typical thermoplastic uses, such as molding resins and fibers. Disclosed herein are poly(imide-esters) and poly(imideamides), which have such properties, and are particularly easy to form into useful shapes by melt processing. These polyimides are based on 4-(3-aminophenoxy)benzoic acid (herein sometimes abbreviated as APBA) as one of the monomeric units. Polyimides made with this repeat unit usually have an exceptional balance of good physical properties and melt formability.

German Patent 3,910,276 describes a preparation of (3-aminophenoxy)benzoic acids. It generally states that they may be used in polymers.

SUMMARY OF THE INVENTION

This invention concerns thermoplastic, comprising, a poly(imide-ester) or a poly(imide-amide), which contains a repeat unit of the formula

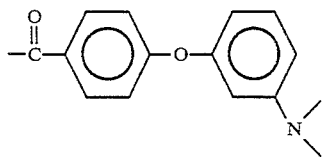

wherein the nitrogen atom is part of an aromatic imide group, and the carbonyl group is part of an ester or amide group.

DETAILS OF THE INVENTION

The present invention concerns certain thermoplastic polyimides. By thermoplastic herein is meant that the polyimide has a glass transition temperature (Tg) and/or melting point (Tm) above ambient temperature (usually taken as about 25° C.), and may be melt processed at a temperature below which significant thermal degradation takes place. This would normally mean it is melt processable at a temperature of about 400° C. or less. It is preferred if the polyimides herein are isotropic (not liquid crystalline in the melt).

The instant polyimides contain an "aromatic imide group". By this is meant that in the imide grouping,

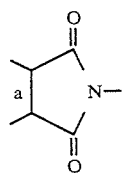

the bond marked "a" will be part of an aromatic ring. Since imides are most commonly made from cyclic anhydrides, at least some of the imide groups in the instant polyimides could be said to be derived from cyclic aromatic carboxylic anhydrides. As can be seen from the Examples, such anhydrides can be monoanhydrides or dianhydrides.

Most commonly, cyclic imides are made from the corresponding cyclic carboxylic anhydrides, and herein, cyclic aromatic carboxylic anhydrides. In order to form a polymer, these anhydrides must be difunctional in the polymerization sense, i.e., contain 2 functional groups that can react to incorporate the anhydride into the polymer chain (except for capping groups, see below). Thus the anhydrides may be a dianhydride, or contain another functional group, preferably carboxyl. Preferred cyclic aromatic carboxylic anhydrides are trimellitic anhydride, pyromellitic dianhydride, benzophenone dianhydride, biphenyl dianhydride, oxydiphthalic anhydride, hexafluoroisopropylidenediphthalic anhydride, or an arylenedioxydiphthalic anhydride. More preferred anhydrides are trimellitic anhydride, pyromellitic anhydride and benzophenone dianhydride.

At least some of the imide linkages in the polyimide contain the amino group in APBA. These linkages would normally be formed by reaction of this amino group with an aromatic cyclic carboxylic anhydride group. Imide linkages formed from other amino groups may also be present in minor amounts (less than 50 molar percent of the total number of imide linkages in the polymer), but it is preferred if essentially all of the imide linkages are formed by the amino group of APBA.

The carboxyl group (or its reactive equivalent) is formed into an amide or ester group by reaction with a diamine or diol or their reactive equivalents, respectively. By reactive equivalent herein is meant a group that will react to form the desired derivative (for example ester or amide) group of the "parent" or "nominal" group (for instance carboxylic acid or amine). Included within the meaning of poly(imide-ester) and poly(imide-amide) are "mixed" polyimides which contain both ester and amide linkages in the polymer main chain (and are formed by using diols and diamines, and/or aminophenols as monomer units).

While any diamine which contains primary and/or secondary amine groups may be used, aromatic diamines are preferred, and preferred aromatic diamines of the formula

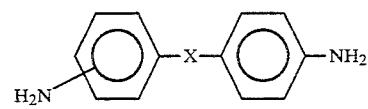

wherein X is a covalent bond, —O—, —C(O)—, —CH$_2$—, —C(CH$_3$)$_2$—, —S—, or —S(O)$_2$—. Similarly, any diol may be used, but preferred diols are aromatic diols, and an especially preferred diol is a substituted hydroquinone, resorcinol, a substituted resorcinol, 2,6-naphthalenediol, 2,7-naphthalenediol, and compounds of the formula

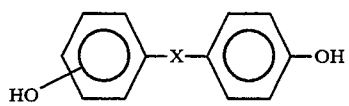

wherein X is a covalent bond, —O—, —C(O)—, —CH$_2$—, —C(CH$_3$)$_2$—, —S—, or —S(O)$_2$—. Similar aminephenols may also be used The polyimide may be a "copolymer", for example, one or more diols, diamines, and cyclic aromatic carboxylic anhydrides may be used. When aromatic diamines and/or diols and/or aminehydroxyl compound are used, if the bonds connecting the two functional groups to the aromatic ring(s) are linear with respect to one another, and/or the compound is highly symmetrical, the polyimide formed is more likely to melt higher than 400° C. Such compounds include hydroquinone, p-phenylenediamine and p-aminophenol. If it is desired to use such a monomer, simple synthesis of the desired polymer will readily determine with little experimental work whether the resulting polyimide is suitable for melt forming.

To remove reactive end groups and/or regulate molecular weight the ends of the polymer may be capped by appropriate monofunctional (in a polymerization sense) compounds. For instance a monocarboxylic acid (e.g., benzoic acid), a monofunctional cyclic aromatic anhydride (phthalic anhydride), or a monoamine (aniline).

The polymers described herein may be readily made by a variety of procedures. The polymers may be made in the melt or in solution; melt synthesis is preferred. Particularly for higher melting crystalline polymers, the polymer molecular weight may be increased by solid state polymerization (see Example 3). Some polymers, depending on their structure, can be made in a one step process from the monomers (see Example 8), or by a two step process (see Example 1 with Examples 3, 4, and 5 and Example 2 with Examples 6 and 7). If the diol used herein contains one or two aromatic hydroxyl groups (bound directly to an aromatic ring), the esters of such hydroxyl groups are readily formed from a reactive equivalent of those hydroxyl groups, their acetate (or other monocarboxylic acid) esters. Similarly, amide groups are readily formed from amides and carboxylic acids by using an amide of a lower monocarboxylic acid (e.g., acetic acid) as a reactive equivalent of an amine. Preparation of such starting materials is known, and some are illustrated in the Experiments. Methods for imidization and formation of the ester and/or amide linkages of the final polymer are well known to the art skilled, and can be used to make the instant polymers. Generally speaking, when a poly(imide-ester) is being made the polymerization may be done in one step, with the amine group to form the imide being introduced (as the amine) the same time the diol (or its reactive equivalent) is added. If a specific (in terms of which amine forms that imide and amides present) poly(imideamide) is desired, a two step reaction is often used, although a one step reaction is possible with a combination of amine (to form the imide) and (acet)amide to form polymeric amide linkages.

The polyimides described herein often have an elevated Tg, and if crystalline, Tm (as determined by DSC). While viscous melts are produced, they are generally within the range needed for melt forming of various articles by extrusion and injection molding, for example. The polymers are tough and readily form fibers if they have a high enough molecular weight (fiber forming molecular weight). They generally start to decompose at relatively high temperatures, above the Tg and Tm (if present) of the polyimides. The polyimides may be used for films (for packaging applications), fibers (for fabrics and ropes), and for shaped articles (parts requiring good mechanical properties and/or heat resistance), and all of these can be formed by appropriate melt forming techniques known to the artisan.

When melt formed, the polyimides described herein may contain other ingredients typically used in thermoplastics, such as fillers, reinforcing materials (e.g., glass fiber) colorants, pigments, antioxidants, other stabilizers, etc.

In the Examples, the following abbreviations are used:
DMAc—N,N-dimethylacetamide
DMF—N,N-dimethylformamide
DMSO—dimethylsulfoxide
DSC—differential scanning calorimetry
EtOAc—ethyl acetate
NMP—n-methylpyrrolidone
TGA—thermogravimetric analysis
TLC—thin layer chromatography

EXPERIMENT 1

4-(3-Aminophenoxybenzoic acid) (I)

4-Methyl-3'-nitrophenyl ether (II)

A stirred mixture of 1,3-dinitrobenzene (78.7 g; 0.0468 mole), p-cresol (39.4 g; 0.364 mole), K$_2$CO$_3$ (64.5 g; 0.467 mole), and tris[2-(2-methoxyethoxy)ethyl]amine (0.8 g; 2 mmol) in DMF (360 mL) was heated at reflux for 40 hr. Solids were removed from the cooled reaction mixture by filtration. The filtrate was spin-evaporated in vacuo to an oily residue. The residue was chromatographed on a silica gel column (750 g) packed in and eluted with hexanes-EtOAc (4:1) (5.0 L). Appropriate fractions, as determined by TLC, were combined and spin-evaporated in vacuo to give 75.9 g (91.0%) of an oil suitable for further transformation. An additional 458.8 g of this material was synthesized in a similar manner.

Benzoic acids, 4-(3-nitrophenoxy)-(III)

To a hot (90° C.), stirred solution of (II) (75.6 g; 0.330 mole), NaOH (30.2 g; 0.755 mole), and pyridine (600 mL) in H$_2$O (600 mL) was added KMnO$_4$ (179.9 g; 1.138 mole), portionwise, over 1.5 hr. The resulting mixture was stirred at 90° C. for 18 hr. The reaction mixture was cooled and solids removed by filtration. The filtrate was washed with CH$_2$Cl$_2$ (2×500 mL) and then spin-evaporated in vacuo to a solid residue. This solid was dissolved in H$_2$O (1.0 L) and the stirred solution was acidified with excess conc. HCl (40 mL). The resulting precipitate was collected by filtration and dried to constant weight in vacuo at 45° C. to give 53.4 g (62.5%) of product suitable for further transformation. An additional 331.3 g of comparable material was synthesized in a similar fashion.

Benzoic acid, 4-(3-aminophenoxy)-(I)

A stirred suspension of (III) (55.9 g; 0.216 mole) in H$_2$O (1.0 L) was treated with NaOH (8.60 g; 0.216 mole) to affect solubilization as the sodium carboxylate. NaHCO$_3$ (16.8 g; 0.200 mole) and 5% Pd.C (50% water-wet) (5.6 g) were added and the mixture was stirred under H$_2$ (70 psig) for 4 hr. The catalyst was removed by filtration. The filtrate was acidified to pH=5.0 using conc. HCl (~35 mL). The resulting precipitate was collected by filtration and dried to constant weight in vacuo at 40° C. to give 45.4 g (91.7%) of crude product. Additional reductions were performed to give a total of 236.8 g of comparably pure material. The combined crude products were filtered through a silica gel pad (800 g) packed in and eluted with acetone (6.0 L). The eluate was spin-evaporated in vacuo to an oil. This oil was blended into 50% aq. EtOH (2.0 L). The resulting precipitate was collected by filtration and then triply recrystallized from refluxing 50% aq. EtOH (3×2.0 L), using decolorizing carbon (~5 g) on the second and third recrystallizations. The purified product was dried to constant weight in vacuo at 40° C. to give 125.1 g (52.8% recovery) of material; m.p., 145°–147° C. (corr.).

EXAMPLE 1

N,N'-Bis(4-carboxyphenoxy-3-phenyl)pyromellitimide (IV)

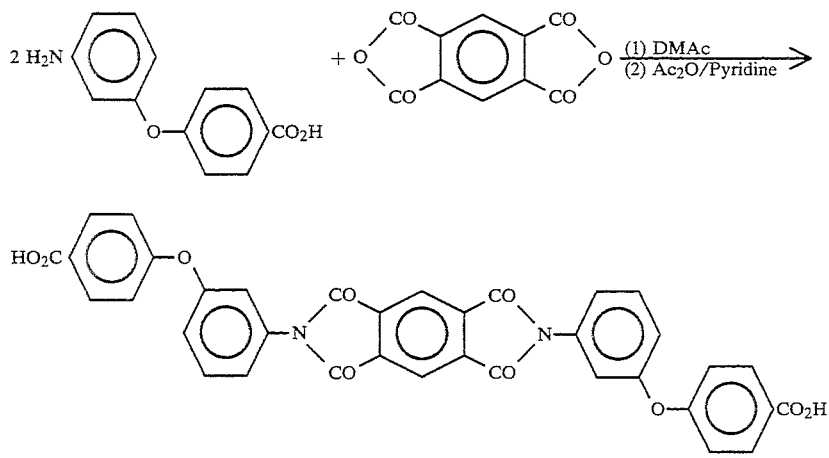

(I) (9.16 g; 0.04 mole) in anhydrous DMAc (100 mL) at room temperature, with stirring, was treated with freshly-dried (160° C./4 hr) pyromellitic dianhydride to give a clear brown solution. After 30 min. acetic anhydride (8.0 mL; ca. 100% excess), followed by anhydrous pyridine (7.0 mL), was added, stirred at 21° C. for 30 min., then at 90° C. for 45 min. The cooled solution was combined with 300 mL cold water to afford a yellow precipitate. This was filtered, washed with DMAc, then water, and dried in vacuo at 100° C. Yield 12.5 g. M.p., 417° C. by DSC.

EXPERIMENT 2

3,4'-Diacetamidodiphenyl ether (V)

3,4'-Diaminodiphenyl ether (100 g) in NMP (800 mL) at 5° C. with stirring was treated with acetyl chloride (78.5 g), whereupon temperature rose to 60° C. After a further 20 min. stirring at room temperature, the solution was poured into 5 liters ice-water. A gummy pink solid separated but, after standing overnight and thorough washing with deionized water, filtration yielded 133 g white solid, m.p. 195.0°–197.5° C.

EXAMPLE 2

4-[3-(N-Trimellitimido)phenoxy]benzoic acid (VI)

To a solution of (I) (18.32 g; 0.08 mole) in anhydrous DMAc (160 mL) was added trimellitic anhydride (15.36 g; 0.08 mole) and the solution stirred 30 min. Acetic anhydride (16 mL) followed by pyridine (14 mL) was added, stirred 30 min. at 21° C., then at 110°–115° C. for 45 min. The cooled solution was poured onto 800 mL ice-water. The gummy solid, which separated, yielded after several treatments with water in a blender, a yellowish-white solid, m.p. 282°–9° C. Recrystallization from boiling DMAc gave m.p. 284°–7° C.

EXAMPLE 3

Melt polymerization of (IV) with phenylhydroquinone diacetate (IV) (9.66 g; 0.0150 mole) and phenylhydroquinone diacetate (4.33 g; 0.0161 mole; 7% excess) were polymerized in a three-necked flask equipped with an air-driven stirrer, distillation take-off, slow bleed of supernatant argon, and external heating by a Wood's metal bath. Temperature was raised from 240° C. to 310° C. under argon during 5.7 hr. Acetic acid was evolved but the mixture remained a solid cake. It was cooled, ground finely, and solid phase polymerized for 4 hr/315° C./0.01 mm Hg to give a polymer stick temperature of 325° C. and a melting temperature of 355° C. The melt was not very viscous. Further heating 7 hr/335° C./0.01 mm Hg did not alter its appearance as an opaque, brown solid but stick temperature increased to 344° C. and melting temperature to 366° C. Somewhat greater viscosity permitted drawing of short, brittle fibers. The polymer was insoluble in pentafluorophenol and o-dichlorobenzene. DSC indicated sharp crystalline melting at 360° C. but no discernible Tg. TGA showed incipient weight loss at 400° C.

EXAMPLE 4

Melt polymerization of (IV) with carbonyl-3,4'-(bisphenylacetate)

(IV) (9.66 g; 0.0150 mole) and carbonyl-3,6'-bisphenyldiacetate (4.47 g; 0.0161 mole; 7% excess) were polymerized as above by heating from 140° C. to 355° C. during 4 hr under argon, and then at 355° C. during 3 hr at 27 Pa. The dark brown, clear polymer was tough and had inherent viscosity of 0.42 in pentafluorophenol. Sticking temperature was 260° C. and melting temperature 335° C. Long fibers were readily drawn from the melt. DSC showed Tg=214° C. and no crystalline melting. TGA showed incipient weight loss at 450° C.

EXAMPLE 5

Polymerization of (IV) with 3,4'-diacetamidodiphenylether (IV) (7.08 g; 0.011 mole) and 3,4-diacetamidodiphenylether (3.16 g; 0.011 mole) were heated under argon with stirring from 230°–300° C. during 5 hr. The semi-solid product was cooled, ground up, and solid phase polymerized for 7 hr at 290° C./1.3 Pa to yield a brown, opaque solid, insoluble in pentafluorophenol, NMP, and DMSO. Polymer stick temperature was 308° C. and polymer melt temperature 350° C. DSC showed Tg=223° C. and crystalline melting at 365° C. Fibers could be pulled from the melt. TGA showed incipient weight loss at about 370° C.

EXAMPLE 6

Polymerization of (VI) with carbonyl (3,4'-bisphenyldiacetate)

(VI) (7.75 g; 0.018 mole) and carbonyl (3,4'-bisphenyldiacetate) (5.63 g; 0.018 mole) were polymerized at 200°–245° C. during 95 min. under argon, then at 245°–255° C. at 0.02 mm for 5 hr to give a clear, tough, amber-colored polymer with $\eta_{inh}$=0.37 in pentafluorophenol. Stick temperature was 209° C. and melting temperature 253° C.; the viscous melt readily yielded fibers. DSC showed a Tg of 166° C. on initial heat-up and 183° C. on second heat-up, but no trace of crystalline melting. TGA showed initial weight loss at about 380° C.

EXAMPLE 7

Polymer from (VI) and (V)

(VI) (8.06 g; 0.02 mole) and (V) (5.74 g; 0.02 mole) were polymerized under argon at 205°–260° C. during 4.5 hr, then at 260° C. for 1 hr at 1.3 Pa to give a very viscous melt. The brown, glassy polymer had $\eta_{inh}$=0.23 in pentafluorophenol, sticking temperature of 211° C. and melting temperature of 253° C. and gave fibers from the melt. DSC showed Tg=193° C. on first cycle and 236° C. on second cycle but no trace of crystalline melting. TGA showed incipient weight loss at 350° C.

The same polymer was melt polymerized further for 5 hr under vacuum at 270° C. $\eta_{inh}$ was now 0.46, with sticking at 242° C. and melting at 286° C. The polymer was now much tougher and readily gave superior fibers. Tg was now 208° C. (first cycle) and 232° C. second cycle but there still was no crystalline melting point.

EXAMPLE 8

Polymer from trimellitic anhydride, (I), and phenylhydroquinone diacetate (single stage)

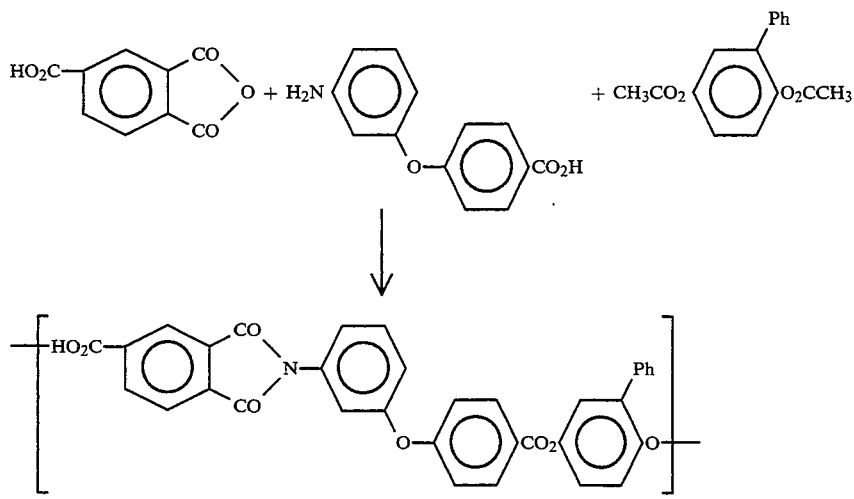

Trimellitic anhydride (9.60 g; 0.05 mole), (V) (11.45 g; 0.05 mole), and phenylhydroquinone diacetate (13.90 g; 0.05 mole) were polymerized at 180°–285° C. during 7 hr under argon, then at 285°–300° C. at 0.05 mm Hg for 5 hr. (The brittle, glass-like polymer at this stage melted at 225° C.) Polymerization was continued at 310°–320° C. for a further 5 hr at 13 Pa to give clear brown tough polymer, of $\eta_{inh}$=0.48 in pentafluorophenol, sticking temperature of 218° C. and melting temperature of 292° C. The viscous melt readily yielded long fibers.

What is claimed is:

1. A thermoplastic, comprising, a poly(imide-ester) or a poly(imide-amide), which contains a repeat unit of the formula

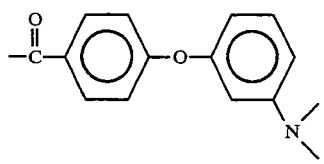

wherein the nitrogen atom is part of an aromatic imide group of the formula

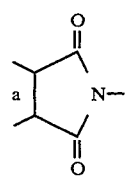

where bond (a) is part of an aromatic ring, and the carbonyl group of structure I is part of an ester or amide group.

2. The thermoplastic as recited in claim 1 which is a poly(imide-ester).

3. The thermoplastic as recited in claim 1 which is a poly(imide-amide).

4. The thermoplastic as recited in claim 2 wherein another repeat unit is derived from a monomer which is an aromatic diol.

5. The thermoplastic as recited in claim 4 wherein said aromatic diol is a substituted hydroquinone, resorcinol, a substituted resorcinol, 2,6-naphthalenediol, 2,7-naphthalenediol, or a compound of the formula

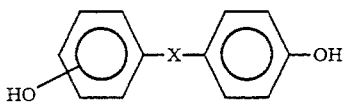

wherein X is a covalent bond, or X is —O—, —C(O)—, —CH$_2$—, —C(CH$_3$)$_2$—, —S—, or —S(O)$_2$—.

6. The thermoplastic as recited in claim 3 wherein another repeat unit is derived from a monomer which is an aromatic diamine.

7. The thermoplastic as recited in claim 6 wherein said aromatic diamine is of the formula

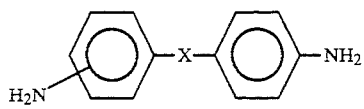

wherein X is a covalent bond, or X is —O—, —C(O)—, —CH$_2$—, —C(CH$_3$)$_2$—, —S—, or —S(O)$_2$—.

8. The thermoplastic as recited in claim 1 wherein another repeat unit is derived from a monomer containing a cyclic aromatic carboxylic anhydride and a carboxyl group, or two aromatic cyclic carboxylic anhydride groups.

9. The thermoplastic as recited in claim 1 wherein a repeat unit is derived from trimellitic anhydride, pyromellitic dianhydride, benzohphenone dianhydride, biphenyl dianhydride, oxydiphthalic anhydride, hexafluoroisopropylidenediphthalic anhydride, or an arylenedioxydiphthalic anhydride.

10. The thermoplastic as recited in claim 5 wherein another repeat unit is derived from a monomer selected from the group consisting of trimellitic anhydride, pyromellitic dianhydride, benzohphenone dianhydride, biphenyl dianhydride, oxydiphthalic anhydride, hexafluoroisopropylidenediphthalic anhydride, and an arylenedioxydiphthalic anhydride.

11. The thermoplastic as recited in claim 7 wherein a repeat unit is derived from trimellitic anhydride, pyromellitic dianhydride, benzohphenone dianhydride, biphenyl dianhydride, oxydiphthalic anhydride, hexafluoroisopropylidenediphthalic anhydride, or an arylenedioxydiphthalic anhydride.

12. A fiber of the thermoplastic as recited in claim 1.

13. A film of the thermoplastic as recited in claim 1.

14. A shaped article of the thermoplastic as recited in claim 1.

15. The thermoplastic as recited in claim 9 wherein a repeat unit is derived from trimellitic anhydride, pyromellitic anhydride or benzophenone dianhydride.

16. The thermoplastic as recited in claim 10 wherein a repeat unit is derived from trimellitic anhydride, pyromellitic anhydride or benzophenone dianhydride.

17. The thermoplastic as recited in claim 11 wherein a repeat unit is derived from trimellitic anhydride, pyromellitic anhydride or benzophenone dianhydride.

18. The thermoplastic as recited in claim 1 wherein another repeat unit derived from a monomer which is an aminophenol is present.

* * * * *